(12) United States Patent
Bendel et al.

(10) Patent No.: US 8,727,731 B2
(45) Date of Patent: May 20, 2014

(54) METHOD FOR ESTABLISHING A BLADE CONNECTION OF A ROTOR BLADE, A BLADE CONNECTION AND A SECURING ELEMENT FOR A BLADE CONNECTION

(75) Inventors: Urs Bendel, Fockbek (DE); Markus Werner, Kiel (DE); Martin Knops, Fockbek (DE)

(73) Assignee: REpower Systems AG, Homburg (DE)

( * ) Notice: Subject to any disclaimer, the term of this patent is extended or adjusted under 35 U.S.C. 154(b) by 734 days.

(21) Appl. No.: 12/990,002

(22) PCT Filed: Apr. 8, 2009

(86) PCT No.: PCT/DE2009/000488
§ 371 (c)(1),
(2), (4) Date: Oct. 28, 2010

(87) PCT Pub. No.: WO2009/132612
PCT Pub. Date: Nov. 5, 2009

(65) Prior Publication Data
US 2011/0044817 A1  Feb. 24, 2011

(30) Foreign Application Priority Data
Apr. 29, 2008  (DE) .......................... 10 2008 021 498

(51) Int. Cl.
F03D 11/04 (2006.01)
B23P 17/00 (2006.01)
F03D 1/00 (2006.01)
F03D 1/06 (2006.01)
B23P 15/04 (2006.01)

(52) U.S. Cl.
CPC .............. *F03D 1/001* (2013.01); *F03D 1/0658* (2013.01); *F03D 1/0675* (2013.01); *B23P 15/04* (2013.01); *Y02E 10/721* (2013.01)
USPC .................. 416/204 R; 416/229 R; 416/230; 416/239; 416/248

(58) Field of Classification Search
CPC ..... F03D 1/001; F03D 1/0658; F03D 1/0675; Y02E 10/721
USPC .................. 416/229 R, 230, 239, 248, 204 R; 29/889.21, 889.7, 889.71, 889.722
See application file for complete search history.

(56) References Cited

U.S. PATENT DOCUMENTS 7,163,378 B2 * 1/2007 Kildegaard .................... 416/230
7,407,342 B2   8/2008 Seidel
(Continued)

FOREIGN PATENT DOCUMENTS

| DK | 1380 88 | 3/1988 |
| EP | 1 486 415 A1 | 12/2004 |
| JP | 08270540 | 10/1996 |

(Continued)

*Primary Examiner* — Igor Kershteyn
(74) *Attorney, Agent, or Firm* — Nash and Titus, LLC

(57) ABSTRACT

The invention relates to a process for manufacturing a blade connection of a rotor blade for a wind energy system which comprises fastening elements for fastening the blade connection to a hub, which fastening elements are provided on a circular arc, preferably equidistant from each other. Furthermore, the invention relates to a blade connection and a fastening element for a blade connection. The invention is based on the problem of improving the fastening of a rotor blade on the hub of a wind energy system as well as improving the manufacture and/or making a suitable blade connection available. The invention solves this problem as regards the process in that fastening elements formed in pieces are arranged on the circular arc and spaced from each other with spacer elements.

20 Claims, 4 Drawing Sheets

(56) References Cited

U.S. PATENT DOCUMENTS

| | | |
|---|---|---|
| 7,830,030 B2 | 11/2010 | Altemark |
| 2005/0106029 A1* | 5/2005 | Kildegaard ............... 416/229 R |
| 2005/0123374 A1* | 6/2005 | Thorning .................... 411/82.3 |
| 2007/0290426 A1 | 12/2007 | Trede |
| 2009/0102195 A1 | 4/2009 | Altemark |
| 2010/0308596 A1 | 12/2010 | Gawrisch |

FOREIGN PATENT DOCUMENTS

| | | |
|---|---|---|
| JP | 11182408 | 7/1999 |
| WO | WO 03/057457 | 7/2003 |
| WO | WO 2004/110862 | 12/2004 |

\* cited by examiner

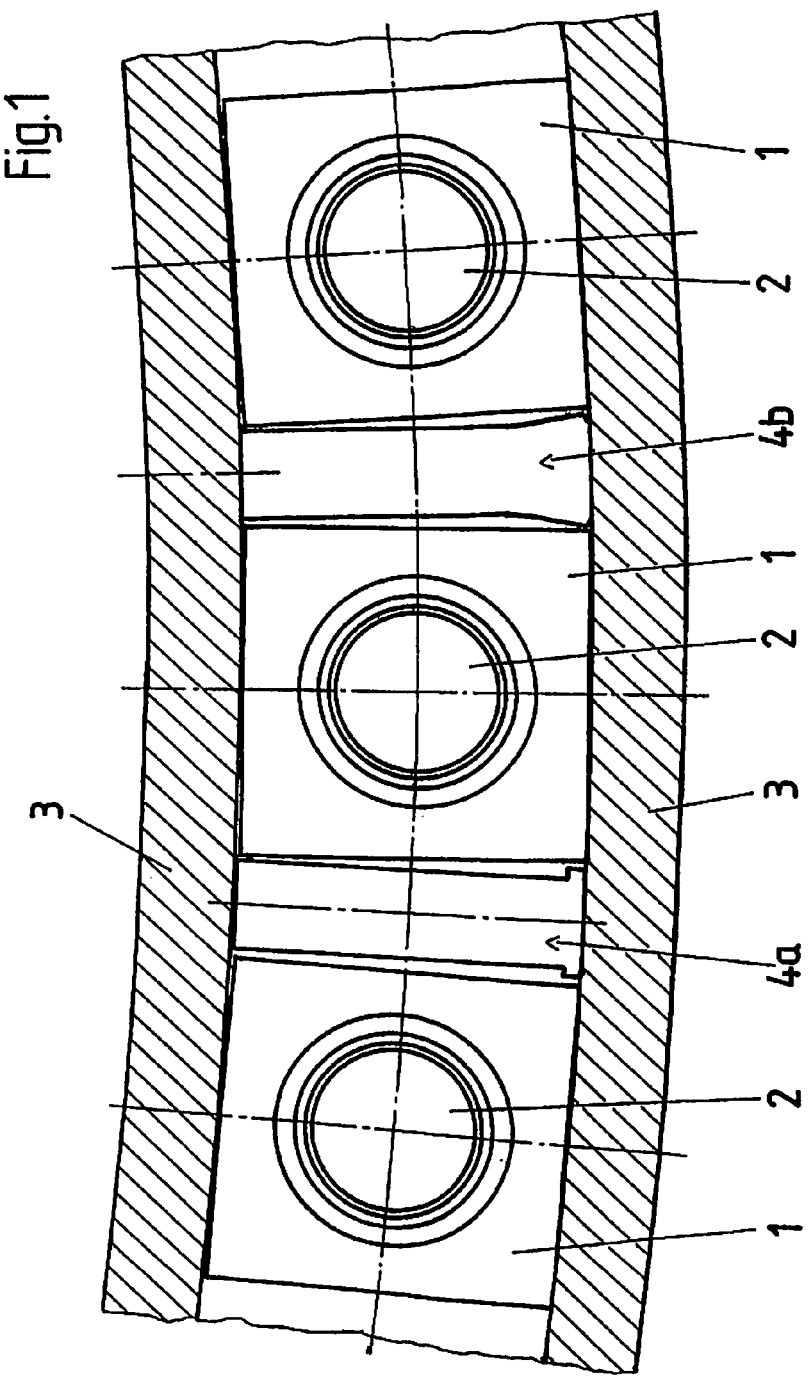

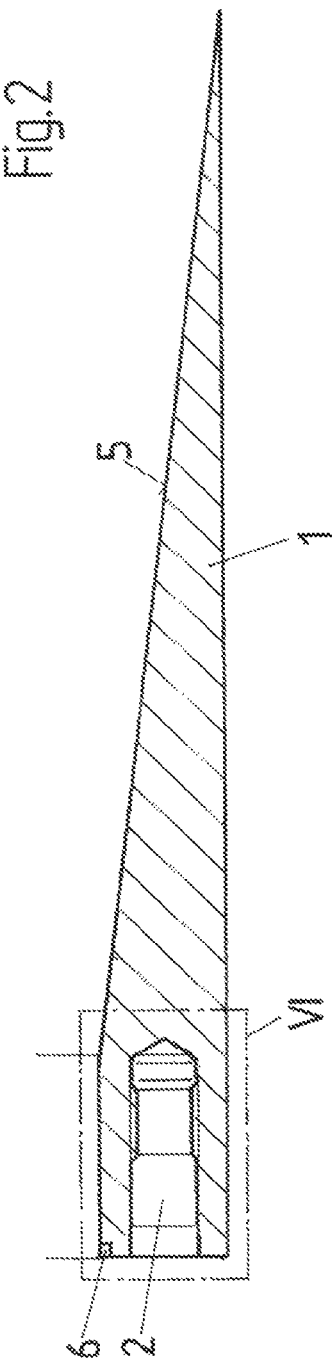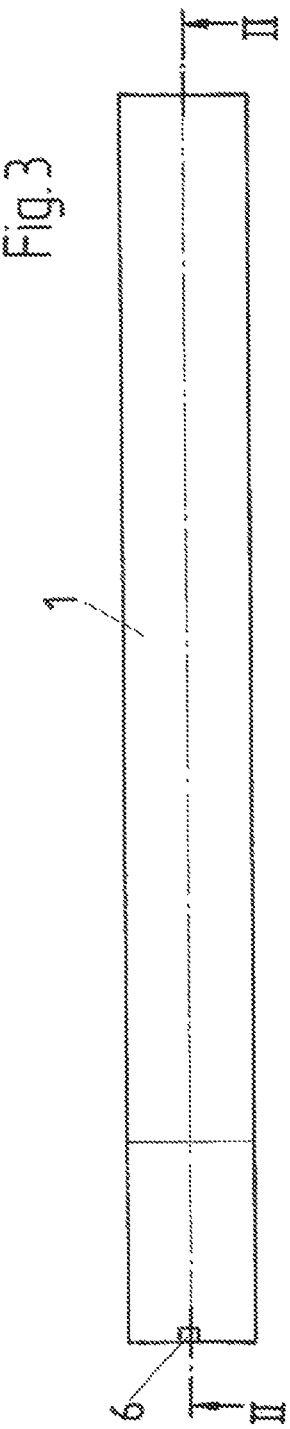

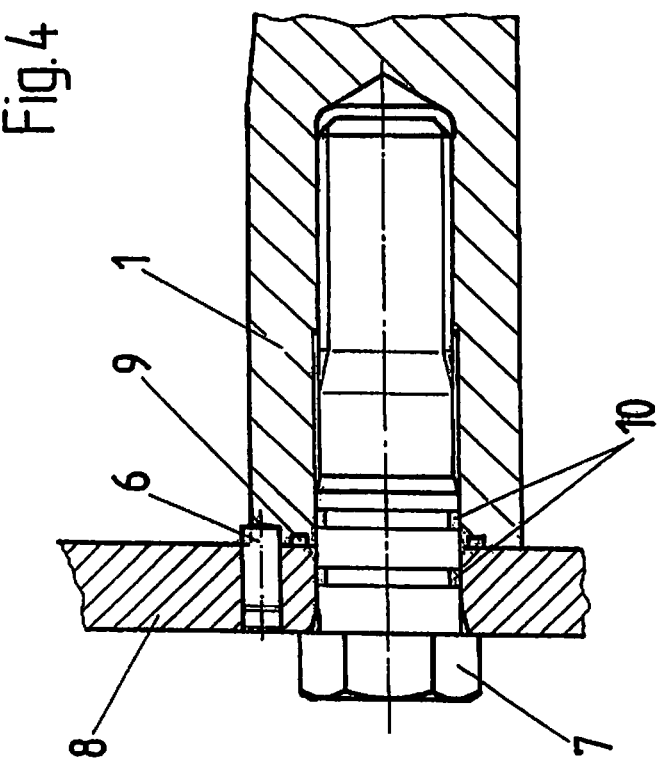

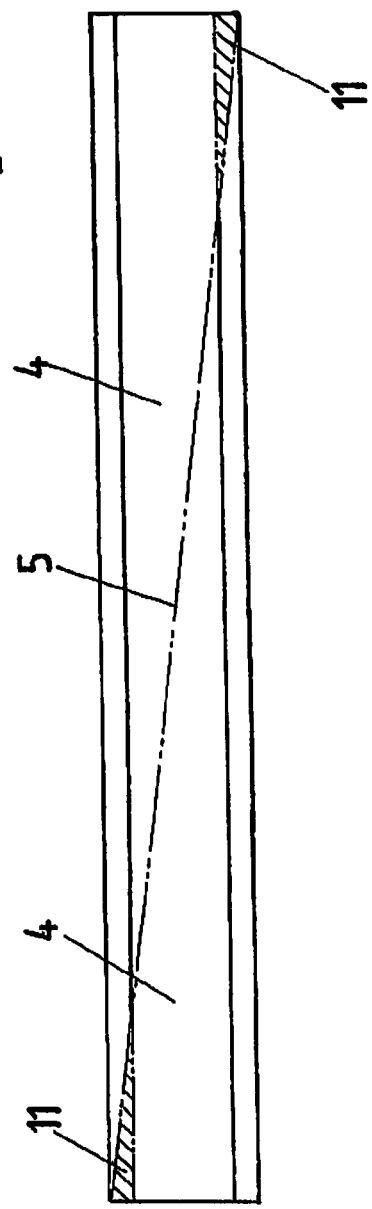
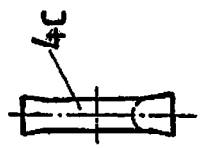

METHOD FOR ESTABLISHING A BLADE CONNECTION OF A ROTOR BLADE, A BLADE CONNECTION AND A SECURING ELEMENT FOR A BLADE CONNECTION

This application is a 371 national application based on PCT/DE2009/000488, filed Apr. 29, 2008, and its entire contents are incorporated herein by reference.

BACKGROUND OF THE INVENTION

The invention relates to a process for manufacturing a blade connection of a rotor blade for a wind energy system which comprises fastening elements for fastening the blade connection to a hub, which fastening elements are provided on a circular arc, preferably equidistant from each other.

Furthermore, the invention relates to a blade connection and a fastening element for a blade connection.

A process, a blade connection and a fastening element of the above-cited species are known in principle from EP 1 486 415 A1.

SUMMARY OF THE INVENTION

The invention has the basic problem of improving the fastening of a rotor blade to the hub of a wind energy system as well as the manufacture and/or making available of a suitable blade connection.

The invention solves this problem as regards the process in that fastening elements formed in pieces are arranged on the circular arc and spaced from each other with spacer elements.

In addition, it is pointed out here that a "circular arc" does not have to follow a circular course precisely, in particular, not necessarily in the production of the blade connection in accordance with the invention. It is desirable to made available the most circular possible and completely circular-shaped blade connection as the outcome since it is especially stable and can provide for the isotropic transfer of force and moments in the connection plane; however, it can be advantageous in the manufacture of the blade connection, that can in particular also be manufactured and joined together from circular segments, to select a form that deviates from a circular arc, in particular a more spread-out form in the manufacturing form in order to already take into account in this manner a form change of a blade connection part occurring in the manufacture and/or later in that possible form changes of the blade connection part then result automatically in an ideal circular form by a skillful selection of the manufactured form.

BRIEF DESCRIPTION OF THE FIGURES

FIG. 1 shows a cutaway portion of the connection surface or connection plane of a blade connection in accordance with the invention.

FIG. 2 shows a longitudinal section through an exemplary embodiment of a fastening element in accordance with the invention along a line designated in FIG. 3 by II-II.

FIG. 3 shows a top view of the fastening element according to FIG. 2.

FIG. 4 shows an enlargement of the cutaway portion of cutaway portion IV framed in FIG. 2.

FIG. 5 shows a lateral view of a manufacturing blank for an exemplary embodiment of spacer elements in accordance with the invention.

FIG. 6 shows a front view of a further exemplary embodiment of a spacer element in accordance with the invention.

DETAILED DESCRIPTION OF THE INVENTION

In general, a blade connection of a rotor blade has the problem of introducing and transmitting forces and moments from the rotor blade into a hub. The blade connection in accordance with the invention is especially well suited for this problem and, in addition, can be manufactured relatively simply and economically, in particular also in series with a large number of pieces.

In particular, several fastening elements can be housed on a length of the circular arc, distributed on the circular arc by a denser placing in which according to the invention a fastening element and a spacer preferably alternate in the course of the circular arc. As a result, the fastening of the blade connection on the hub becomes more stable or can transmit more forces, or the circular arc can be selected to be smaller in its radius with the same number of fastening elements, thus saving material. Especially advantageous placings and dense packings of the fastening elements are possible according to further developments of the invention that are distinguished in that a fastening element is used that has a substantially approximately square, preferably rectangular cross section in a connection plane or parallel to it, that a fastening element is used that has a substantially approximately quadratic cross section or that a trapezoidal cross section is used with a side that tapers radially inward to the circular arc and/or that a substantially approximately strip-shaped spacer element is used that is oriented approximately vertically to a connection plane, which spacer element can have an approximately T-shaped or horseshoe-shaped cross section or an approximately trapezoidal cross-section.

The spacers between the fastening elements receive load deformations in themselves in the case of an ovalization or other loading deformations of the rotor blade. In addition, the spacers should have little stiffness in the direction of their thickness in order that they generate few tensions under deformation and thus compensate the deformations. At the same time, a high degree of stiffness in the longitudinal directions is advantageous in order that the spacers also transmit load from the rotor blade into the fastening elements.

In the case of rectangular or quadratic cross sections of the fastening elements the spacers can ensure a uniform slot width between the fastening elements arranged in a circular form by a suitable shape, in particular the cited trapezoidal shape.

In addition, such shapes have the advantage that the fastening elements and spacers form smooth outer and inner surfaces so that they can be connected to each other especially well and simply by lamination, as is provided according to a further development of the invention, whereby it can preferably be sufficient that a laminate is applied (only) on the radially inner side and on the radially outer side of the arrangement. Preferably known glass fiber structures and/or carbon fiber structures can be used in this laminate. In addition, it can be preferably provided that at least one fastening element and at least one spacer element are connected, in particular, adhered to each other with a resin filling in an intermediate space formed by them, in order to impart additional durability to the arrangement as a composite and to further improve introductions and transmissions of forces and moments. In particular, it can be provided in the manufacture that at least one seal is provided for blocking the resin of an area that should not experience an entrance of resin, for which, for example, seals, for example, in the form of O rings can be provided at suitable spots.

In the manufacture of a blade connection in accordance with the invention it can be advantageously preferably provided that at least one positioning device for positioning at least one fastening element is provided in the blade connection, preferably before and during a fixing of the fastening element. The fastening elements are preferably positioned in a suitable manner during the manufacture of the blade connection and held until they are fixed in the blade connection. To this end substantially a resin infusion technique or vacuum injection technique is preferably used so that the fastening elements can be positioned and held until the substantially approximately casing-shaped or dish-shaped blade connection or blade connection part has hardened and the fastening elements are fixed in position as a result. The positioning device could comprise, for example, a flange against which the fastening elements are sealed. The flange could also have, for example, at least one fit for the fastening elements.

Another further development of the invention provides that the positioning device is placed outside of a vacuum- or underpressure area required for the resin infusion technique and experiences no participation in its sealing, and the manufacturing area provided for the blade connection is therefore sealed in a certain sense in a self-sufficient manner. In particular, it could be sufficient for this that, for example, as a result of sealing bridges from a connection-side front side of a fastening element to the front side of the next fastening element the intermediate space between them is sealed off from the outside, thus, in particular the spacer element located between them and the gap present between the spacer elements and the fastening elements as well as gaps to the outer laminate layers or laminate coats.

The next further development of the invention provides that the or each fastening element is manufactured entirely from metal. Therefore, the elements in accordance with the invention are advantageously constructed in block shape totally of solid material so that they can be more readily produced, better and more readily placed, better and more readily fastened, bonded in or laminated in and are more stable.

A preferred embodiment of the invention is distinguished in that a fastening element and/or a spacer element is/are used that taper/s in a direction toward a rotor blade tip so that these elements fit in better and are better rooted in particular between laminate layers or laminate coatings in the direction of the course of a rotor blade. They could also be supported by positive shapings. The tapering preferably takes place by an oblique flank arranged on the radial inner side.

A next further development of the invention provides that a fastening element is used that comprises a bolt hole for introducing a connecting element and/or a positioning element.

Basically, a fastening element could have a male design, that is, for example, already have a screw bolt for screwing the blade connection to a hub, or have a female design in that it comprises a bolt hole, as in the previously described preferred embodiment, or it could at first have a neutral construction and receive a threaded screw hole only after the manufacture of the blade connection, for example, with a thread cutter. However, the female form is preferred for technical reasons of construction and manufacturing.

In order to fasten the blade connection to the hub a screw bolt can be screwed into the preferably present bolt hole or, for example, even so-called T-bolts can be used. During the manufacture the bolt hole can preferably serve for the positioning and holding of the fastening element in that a positioning pin or the like, preferably with a conical form, is introduced there. For a reliable introduction the bolt hole could have a through cut or undercut, that is, for example, not be formed as a blind hole. In addition, an undercut reduces possibly occurring groove stresses. In particular, it must be provided in a vacuum injection that this bolt hole is protected and sealed against an entrance of resin. This could take place by a substantially O-shaped seal coaxially around the bolt hole and by a positioning pin and at a distance from it.

The bolt hole can, as already mentioned, have an inner screw threading. It can be cut or reshaped in order to obtain higher dynamic strengths, in particular by introducing intrinsic pressure stresses.

In particular, steel can be considered as metal for the fastening elements.

Another further development of the invention provides in a particularly advantageous manner that the blade connection is pre-manufactured as a part, especially as a mounted part or added-on part, for a rotor blade to be manufactured subsequently. In particular, therefore, several such mounted parts can be pre-manufactured, preferably in their own resin infusion mold, and subsequently bonded in as finished mounted parts and connected to each other, in particular placed into a resin fusion mold for a rotor blade.

As has already been mentioned several times above, it can be provided in accordance with the invention that a closed circle or a segment of it, in particular a semicircle is selected as circular arc for the blade connection.

Accordingly, it can be provided in accordance with the invention that the rotor blade receives a blade connection or several such blade connections as a function of the circular arc of the blade connection in such a manner that the finished rotor blade has a full-circle connection root for the connection to a hub.

Another further development of the invention is distinguished in that the blade connection is designed asymmetrically from the connection plane in the direction of the tip of the rotor blade relative to an axis of a circular arc. In particular, it can be advantageously provided in accordance with the invention that the blade connection as a mounted part or added-on part already makes a part of a carrying surface form or wing form available for the rotor blade or of the rotor blade in its free end area.

Another further development of the invention provides that the blade connection is provided with a tear-off foil at least in a partial area during its manufacture, which foil leaves a continuous but rough surface after it has been torn off that can be further treated, in particular lacquered.

Independent protection is also claimed for a blade connection of a rotor blade for a wind energy system which blade connection comprises fastening elements for fastening the blade connection to a hub, which fastening elements are provided on a circular arc, preferably equidistant from each other, and which blade connection is distinguished in accordance with the invention in an independent solution of the problem posed in that fastening elements formed in pieces are arranged on the circular arc at a distance from each other by spacer elements. The advantages resulting from the solution in accordance with the invention and from its further developments have already been sufficiently logically explained above in conjunction with the process of the invention and its further developments.

Furthermore, independent protection is also claimed for a fastening element of a blade connection of a rotor blade for a wind energy system which fastening element is characterized in a solution in accordance with the invention for the posed problem by a substantially approximately four-cornered, preferably approximately rectangular cross section in a connection plane or parallel to it.

Exemplary embodiments from which further inventive features can result but which to not limit the invention in its scope are shown in the drawings.

FIG. 1 shows a cutaway portion of the connection surface of a blade connection in accordance with the invention.

The cutaway portion shown follows a circular segment. Several fastening elements 1 in accordance with the invention are arranged on this circular segment that are constructed substantially approximately quadratically or in a block shape in their front view shown. Each fastening element 1 contains a bore 2 with an inner threading for screwing in a bolt or a fastening screw. A spacer element 4 is arranged between each two fastening elements 1 of which spacer elements two exemplary embodiments are shown in FIG. 1, a first exemplary embodiment 4a with an approximately T-shaped front surface and a second exemplary embodiment 4b with a more horseshoe-shaped front surface. Slots remain between spacer elements 4 and fastening elements 1 that can be filled, for example, with resin.

In order to connect and strengthen the crown of fastening elements 1 and spacer elements 4, an inner and an outer layer of a connecting material 3, for example, a glass fiber material, are provided which material is impregnated, for example, with resin and can be connected to the other elements cited, for example, by an infusion process or an injection process.

FIG. 2 shows a longitudinal section through an exemplary embodiment of a fastening element 1 in accordance with the invention along a line designated in FIG. 3 by II-II. The same construction elements are designated with the same reference numerals, as also in the other figures.

FIG. 2 shows in particular bore 2 in a sectional view as well as a second, smaller bore 6 for a possible tight-fit screw. Furthermore, it can be recognized in FIG. 2 that fastening element 1 tapers toward its free end, preferably along a slope 5 preferably arranged on the radial inner side of fastening element 1 relative to the circular arc.

FIG. 3 shows a top view onto fastening element 1 according to FIG. 2.

FIG. 4 shows an enlargement of the cutaway portion of cutaway portion IV framed in FIG. 2. It can be gathered from this FIG. 4 how fastening element 1 could be fastened by a fastening screw 7 for fastening the blade connection to a hub and/or possibly also to a flange-like holder 8 during the manufacture of the blade connection. Even a possible tight-fit screw in bore 6 is indicated as well as possible circumferential grooves 9, 10 for seals.

FIG. 5 shows a lateral view of a manufacturing blank for an exemplary embodiment of spacer elements 4 in accordance with the invention. Spacer elements 4 are constructed in an oblong manner and also taper along a slope 5. Therefore, two spacer elements 4 shown in dotted lines are to be cut as shown from a blank, with only a little waste 11 accumulating. A similar blank could also be possible for fastening elements 1.

FIG. 6 shows a third exemplary embodiment 4c of a front side of a spacer element that looks approximately like a double horseshoe. Accordingly, for example, a double T-shaped front view could also be considered. Such profiles are considered in particular when the fastening elements 1 have a more trapezoidal front surface so that a circular form results more readily in the arrangement of spacer elements 4 and of fastening elements 1.

The invention claimed is:

1. A process for manufacturing a blade connection of a rotor blade for a wind energy system which comprises fastening elements for fastening the blade connection to a hub, which fastening elements are provided on a circular arc, and the fastening elements formed in pieces are arranged on the circular arc and spaced from each other with spacer elements, characterized in that a fastening element is used that has a substantially square, cross section in a connection plane or parallel to it or has a trapezoidal cross section, and in that a substantially strip-shaped spacer element is used that is oriented approximately vertically to a connection plane and has a T-shaped, horseshoe-shaped or trapezoidal cross section.

2. The process according to claim 1, characterized in that each two fastening elements adjacent to one another are spaced from each other by at least one spacer element.

3. The process according to claim 2, characterized in that a fastening element is used that has a trapezoidal cross section with a side tapering radially inward to the circular arc.

4. The process according to claim 2, characterized in that the arrangement of fastening elements and spacer elements are connected to each other by lamination and are arranged only on the radially inner side and on the radially outer side of the arrangement.

5. The process according to claim 2, characterized in that at least one fastening element and at least one spacer element are connected to each other with a resin filling in an intermediate space formed by them.

6. The process according to claim 1, characterized in that a closed circle or a segment of it is selected as circular arc for the blade connection and that the rotor blade receives a blade connection or several such blade connections as a function of the circular arc of the blade connection in such a manner that the finished rotor blade has a full-circle connection root for the connection to a hub.

7. The process according to claim 6, characterized in that the blade connection is designed asymmetrically from a connection plane in the direction of the tip of the rotor blade relative to an axis of a circular arc and that the mounted part or added-on part already makes a part of a carrying surface form or wing form available in its free end area.

8. The process according to claim 1, characterized in that the blade connection is provided with a tear-off foil at least in a partial area during its manufacture, which foil leaves a continuous but rough surface after it has been torn off that can be further treated.

9. A blade connection of a rotor blade for a wind energy system which comprises fastening elements for fastening the blade connection to a hub, which fastening elements are provided on a circular arc characterized in that fastening elements formed in pieces are arranged on the circular arc and spaced from each other with substantially strip shaped spacer elements and at least one fastening element has a substantially square, cross section in a connection plane or parallel to it or has at least one trapezoidal cross section and at least one strip-shaped spacer element is oriented approximately vertically to a connection plane and has an approximately T-shaped or horseshoe-shaped or approximately trapezoidal cross section.

10. The blade connection according to claim 9, characterized in that each two fastening elements adjacent to one another are spaced from each other by at least one spacer element.

11. The blade connection according to claim 9, characterized in that at least one fastening element has a rectangular cross section in a connection plane or parallel to it.

12. The blade connection according to claim 11, characterized in that at least one fastening element has a substantially quadratic cross section.

13. The blade connection according to claim 11, characterized in that at least one fastening means has at least one trapezoidal cross section with a side that tapers radially inward to the circular arc.

14. The blade connection according to claim 9, characterized in that the arrangement of fastening elements and spacer elements are connected to each other by lamination and that a laminate is arranged only on the radially inner side and on the radially outer side of the arrangement.

15. The blade connection according to claim 9, characterized in that at least one fastening element and at least one spacer element are connected to each other with a resin filling in an intermediate space formed by them.

16. The blade connection according to claim 9, characterized in that the blade connection is constructed in the shape of a circular arc as a closed circle or a segment of it, and that a rotor blade comprises a blade connection or several such blade connections as a function of the circular arc of the blade connection in such a manner that the finished rotor blade has a full-circle connection root for the connection to a hub.

17. The blade connection according to claim 16, characterized in that the blade connection is designed asymmetrically from a connection plane in the direction of the tip of the rotor blade relative to an axis of a circular arc and that the mounted part or added-on part already makes a part of a carrying surface form or wing form available in its free end area.

18. The blade connection according to claim 9, characterized in that the blade connection has a tear-off foil at least in a partial area during its manufacture, which foil leaves a continuous but rough surface after it has been torn off that can be further treated.

19. A fastening element of a blade connection of a rotor blade for a wind energy system, characterized by a substantially approximately square or trapezoidal cross section in a connection plane or parallel to it.

20. The fastening element according to claim 19, characterized in that it tapers in a direction toward the tip of a rotor blade.

* * * * *